(12) United States Patent
Ramasubramonian et al.

(10) Patent No.: US 11,871,037 B2
(45) Date of Patent: Jan. 9, 2024

(54) SORTED LASER ANGLES FOR GEOMETRY-BASED POINT CLOUD COMPRESSION (G-PCC)

(71) Applicant: QUALCOMM Incorporated, San Diego, CA (US)

(72) Inventors: Adarsh Krishnan Ramasubramonian, Irvine, CA (US); Bappaditya Ray, San Diego, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/354,713

(22) Filed: Jun. 22, 2021

(65) Prior Publication Data

US 2021/0409778 A1    Dec. 30, 2021

Related U.S. Application Data

(60) Provisional application No. 63/044,862, filed on Jun. 26, 2020.

(51) Int. Cl.
*H04N 19/70*     (2014.01)
*H04N 19/20*     (2014.01)

(52) U.S. Cl.
CPC ............. *H04N 19/70* (2014.11); *H04N 19/20* (2014.11)

(58) Field of Classification Search
CPC ...... H04N 19/70; H04N 19/20; H04N 19/597; G06T 9/001
See application file for complete search history.

(56) References Cited

U.S. PATENT DOCUMENTS

| | | | |
|---|---|---|---|
| 2019/0310350 A1* | 10/2019 | Lee | G01S 7/4808 |
| 2020/0394822 A1* | 12/2020 | Gao | G06T 9/001 |
| 2021/0289211 A1* | 9/2021 | Oh | H04N 19/186 |
| 2021/0400103 A1* | 12/2021 | Hur | H04L 67/10 |

FOREIGN PATENT DOCUMENTS

WO    WO-2021084295 A1 *    5/2021    ............ G06T 9/40

OTHER PUBLICATIONS

International Search Report and Written Opinion of International Application No. PCT/US2021/038642, dated Oct. 6, 2021, 11 pp.
Co-pending U.S. Appl. No. 17/224,608, inventor Van Der Auwera; Geert, filed Apr. 7, 2021.
Co-pending U.S. Appl. No. 17/224,653, inventor Ray; Bappaditya, filed Apr. 7, 2021.
ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

(Continued)

*Primary Examiner* — Richard A Hansell, Jr.
(74) *Attorney, Agent, or Firm* — Shumaker & Sieffert, PA

(57) ABSTRACT

Point clouds may be coded using a plurality of laser angles. In one example, a video coder may be configured to code a plurality of syntax elements that indicate respective values of a plurality of laser angles in a sorted order according to a constraint.

30 Claims, 12 Drawing Sheets

(56) References Cited

OTHER PUBLICATIONS

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.
Auwera (QUALCOMM) G.V.D., et al., "[GPCC] [New Proposal] Angular Mode Simplifications and HLS Refinements", 130. MPEG Meeting, Apr. 20, 2020-Apr. 24, 2020, Alpbach, (Motion Picture Expert Group or ISO/IEC JTC1/SC29/WG11), No. m53693, Apr. 15, 2020, XP030287372, 12 Pages.
"Information Technology—MPEG-I (Coded Representation of Immersive Media)—Part 9: Geometry-based Point Cloud Compression", ISO/IEC 23090-9:2020(E), ISO/IEC JTC 1/SC 29/WG 11, 2020, 127 pages.
Taquet (Blackberry) J., et al., "[G-PCC] Crosscheck of m53693 on Angular Mode Simplifications and HLS Refinements," 130. MPEG Meeting, Apr. 20, 2020-Apr. 24, 2020, Alpbach, (Motion Picture Expert Group or ISO/IEC JTC1/SC29/WG11), No. m53964, Apr. 23, 2020, XP030287902.

\* cited by examiner

SORTED LASER ANGLES FOR GEOMETRY-BASED POINT CLOUD COMPRESSION (G-PCC)

This application claims the benefit of U.S. Provisional Patent Application No. 63/044,862, filed Jun. 26, 2020, the entire content of which is incorporated by reference herein.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques and devices for improving the coding of laser angles for angular and azimuthal modes in the Geometry-based Point Cloud Compression (G-PCC) standard that is being developed within the 3-dimensional graphics (3DG) working group of the Motion Picture Experts Group (MPEG). The G-PCC standard provides for syntax elements related to angular and azimuthal modes. These syntax elements include syntax elements indicating laser angles for individual laser beams and syntax elements indicating numbers of probes in an azimuth direction, e.g., during a full rotation of a laser beam or for other ranges of angles of the laser beam. This disclosure describes techniques that may improve coding efficiency of such syntax elements. In particular, this disclosure describes techniques for encoding and decoding syntax elements that indicate laser angles in a sorted order. In this way, decoder side sorting may be avoided and certain coding tools that use laser angles may be performed more quickly. While some example techniques of this disclosure will be described with respect to angular and azimuthal modes, the techniques of this disclosure may be used with any coding modes that use laser angles.

In one example, this disclosure describes a method of encoding point cloud data, the method comprising encoding the point cloud data using a plurality of laser angles, and encoding a plurality of syntax elements that indicate respective values of the plurality of laser angles in a sorted order according to a constraint.

In another example, this disclosure describes an apparatus configured to encode point cloud data, the apparatus comprising a memory configured to store the point cloud data, and one or more processors implemented in circuitry and in communication with the memory, the one or more processors configured to encode the point cloud data using a plurality of laser angles, and encode a plurality of syntax elements that indicate respective values of the plurality of laser angles in a sorted order according to a constraint.

In another example, this disclosure describes a method of decoding point cloud data, the method comprising decoding a plurality of syntax elements that indicate respective values of a plurality of laser angles in a sorted order according to a constraint, and decoding the point cloud data using the plurality of laser angles.

In another example, this disclosure describes an apparatus configured to decode point cloud data, the apparatus comprising a memory configured to store the point cloud data, and one or more processors implemented in circuitry and in communication with the memory, the one or more processors configured to decode a plurality of syntax elements that indicate respective values of a plurality of laser angles in a sorted order according to a constraint, and decode the point cloud data using the plurality of laser angles.

The details of one or more examples are set forth in the accompanying drawings and the description below. Other features, objects, and advantages will be apparent from the description, drawings, and claims.

DETAILED DESCRIPTION

Figure 1:
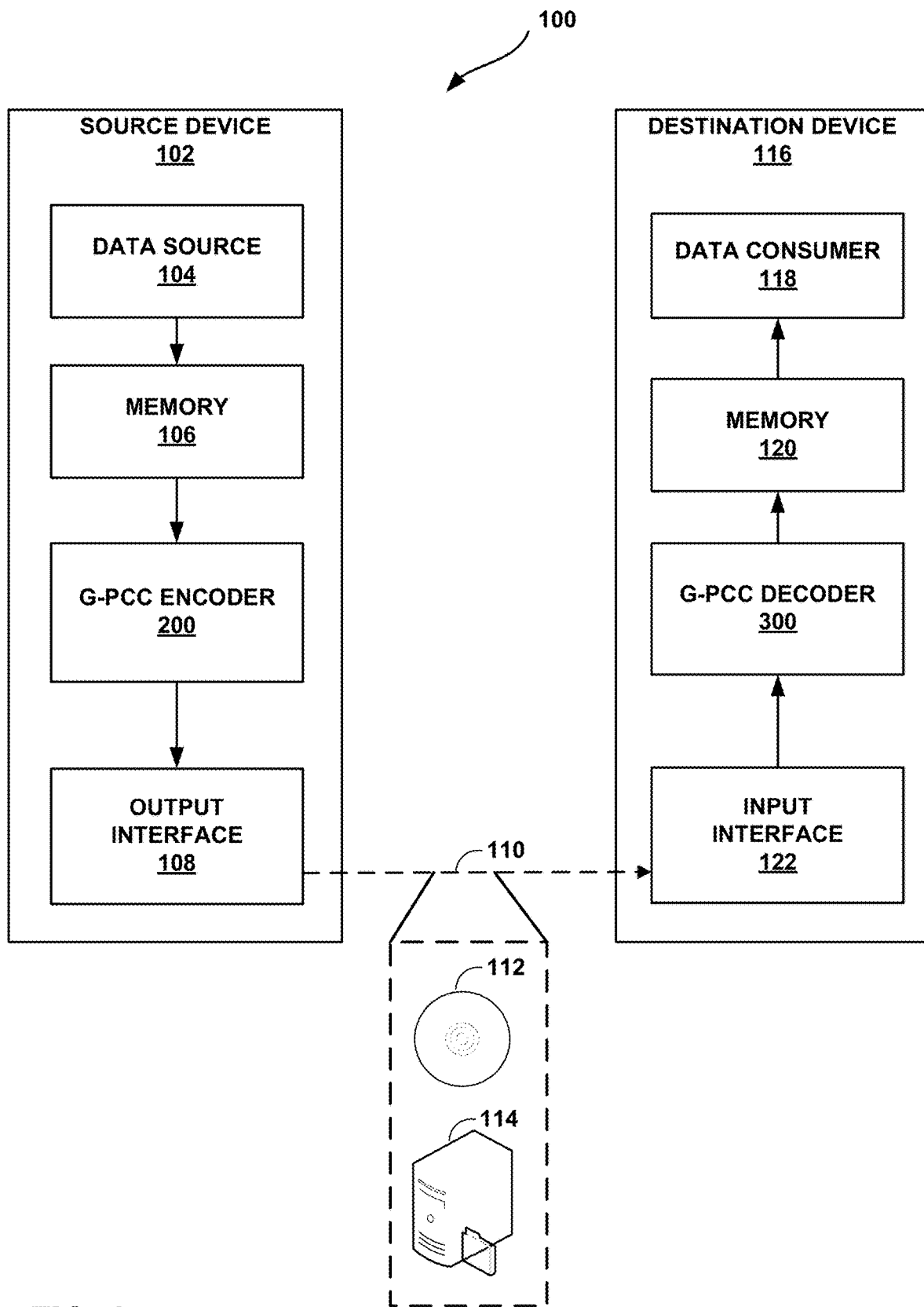
FIG. 1 is a block diagram illustrating an example encoding and decoding system that may perform the techniques of this disclosure.

A point cloud is a collection of points in a 3-dimensional (3D) space. Geometry-based point cloud compression (G-PCC) is an approach for reducing the amount of data needed to store point clouds. As part of encoding a point cloud, a G-PCC encoder may generate an octree. Each node of the octree corresponds to a cuboid space. For ease of explanation, this disclosure may, in some circumstances, refer to a node and the cuboid space corresponding to the node interchangeably. Nodes of the octree can have zero child nodes or eight child nodes. The child nodes of a parent node correspond to equally sized cuboids within the cuboid corresponding to the parent node. The positions of individual points of a point cloud can be coded relative to nodes containing the points. If a node does not contain any points of the point cloud, the node is said to be unoccupied. If the node is unoccupied, it may not be necessary to code additional data with respect to the node. Conversely, if a node contains one or more points of the point cloud, the node is said to be occupied. Nodes may be further subdivided into voxels. The G-PCC encoder may indicate the positions of individual points within a point cloud by indicating locations of voxels occupied by points of the point cloud.

G-PCC provides multiple coding tools to code the locations of occupied voxels within a node. These coding tools include an angular coding mode and an azimuthal coding mode. The angular coding mode is based on a set of laser beams arranged in a fan pattern. The laser beams may correspond to real laser beams (e.g., of a LIDAR device) or may be conceptual (e.g., computer-generated). The G-PCC encoder may encode angles between the laser beams in a high-level syntax structure. A location of a point within a node may only be coded using the angular coding mode if only one of the laser beams intersects the node. When the location of a point in a node is coded using the angular coding mode, the G-PCC encoder determines a vertical offset between a position of the point and an origin point of the node. The G-PCC encoder may determine a context based on a position of a laser beam relative to a marker point (e.g., center point) of the node. The G-PCC encoder may apply context-adaptive arithmetic coding (CABAC) using the determined context to encode one or more bins of a syntax element indicating the vertical offset.

When the location of a point is coded using the azimuthal coding mode, the G-PCC encoder may determine a context based on an azimuthal sampling location of a laser beam within a node. The G-PCC encoder may apply CABAC using the determined context to encode a syntax element indicating an azimuthal offset of the point.

Use of the angular and azimuthal modes may deliver higher coding efficiency in some circumstances because information about how the laser beam intersects a node may improve the selection of contexts for encoding syntax elements indicating vertical and azimuthal offsets. Improved selection of contexts may result in greater compression in the CABAC encoding process.

Some examples of the developing G-PCC standard provide for syntax elements related to angular and azimuthal modes. These syntax elements include syntax elements indicating laser angles for individual laser beams (or laser angle deltas between adjacent laser angles) and syntax elements indicating numbers of probes in an azimuth direction, e.g., during a full rotation of a laser beam or in another range of angles of the laser beam (e.g., less than or more than a full rotation). This disclosure describes techniques that may improve coding efficiency of such syntax elements. In particular, this disclosure describes techniques for encoding and decoding syntax elements that indicate laser angles in a sorted order. In this way, decoder side sorting may be avoided and certain coding tools that use laser angles may be performed more quickly.

In one example of the disclosure, a G-PCC encoder may be configured to encode the point cloud data using a plurality of laser angles, and encode a plurality of syntax elements that indicate respective values of the plurality of laser angles in a sorted order according to a constraint.

Likewise, in one example of the disclosure, a G-PCC decoder may be configured to decode a plurality of syntax elements that indicate respective values of a plurality of laser angles in a sorted order according to a constraint, and decode the point cloud data using the plurality of laser angles.

Although this disclosure describes lasers, laser beams, laser candidates, and other terms involving lasers, these terms are not necessarily limited to instances in which physical lasers are used. Rather, these terms may be used with respect to physical lasers or other range-finding technologies. Moreover, these terms may be used with respect to beams that do not physically exist but the concept of the beam is used for purposes of coding point clouds.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, surveillance or security equipment, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. G-PCC encoder 200 of source device 102 and G-PCC decoder 300 of destination device 116 may be configured to apply the techniques of this disclosure related to the coding of laser angles. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to the coding of laser angles. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. Similarly, the term "coding" may refer to either of encoding or decoding.

In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames" of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. In this way, data source 104 may generate a point cloud. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud. In other words, memory 106 and memory 120 may be configured to store point cloud data.

Computer-readable medium 110 may represent any type of medium or device capable of transporting the encoded data from source device 102 to destination device 116. In one example, computer-readable medium 110 represents a communication medium to enable source device 102 to transmit encoded data (e.g., encoded point cloud) directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

In some examples, source device 102 and/or destination device 116 are mobile devices, such as mobile phones, augmented reality (AR) devices, or mixed reality (MR) devices. In such examples, source device 102 may generate and encode a point cloud as part of a process to map the local environment of source device 102. With respect to AR and MR examples, destination device 116 may use the point cloud to generate a virtual environment based on the local environment of source device 102. In some examples, source device 102 and/or destination device 116 are terrestrial or marine vehicles, spacecraft, or aircraft. In such examples, source device 102 may generate and encode a point cloud as part of a process to map an environment of the source device, e.g., for purposes of autonomous navigation, crash forensics, and other purposes.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud. For example, data consumer 118 may use points of the point cloud as vertices of polygons and may use color attributes of points of the point cloud to shade the polygons. In this example, data consumer 118 may then rasterize the polygons to present computer-generated images based on the shaded polygons.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and projects the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry, i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020 (hereinafter, "w19088"), and a description of the codec is available in G-PCC Codec Description v6, ISO/IEC JTC1/SC29/WG11 w19091, Brussels, Belgium, January 2020 (hereinafter, "w19091").

U.S. patent application Ser. No. 17/224,653, filed Apr. 7, 2021, U.S. patent application Ser. No. 17/224,608, filed Apr. 7, 2021, U.S. Provisional Application No. 63/007,282, filed Apr. 8, 2020, U.S. Provisional Application No. 63/009,940, filed Apr. 14, 2020, and U.S. Provisional Application No. 63/036,799, filed Jun. 9, 2020 describe subject matter related to this disclosure.

A point cloud contains a set of points in a 3D space and may have attributes associated with the points. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), the automotive industry (LIDAR sensors used to help in navigation), in mobile phones, in tablet computers, and in other scenarios.

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on the number of points in each partition, or based on other considerations (e.g., a particular region may be coded as tiles). The slice regions may be further partitioned using splitting decisions similar to those in video codecs.

Figure 2:
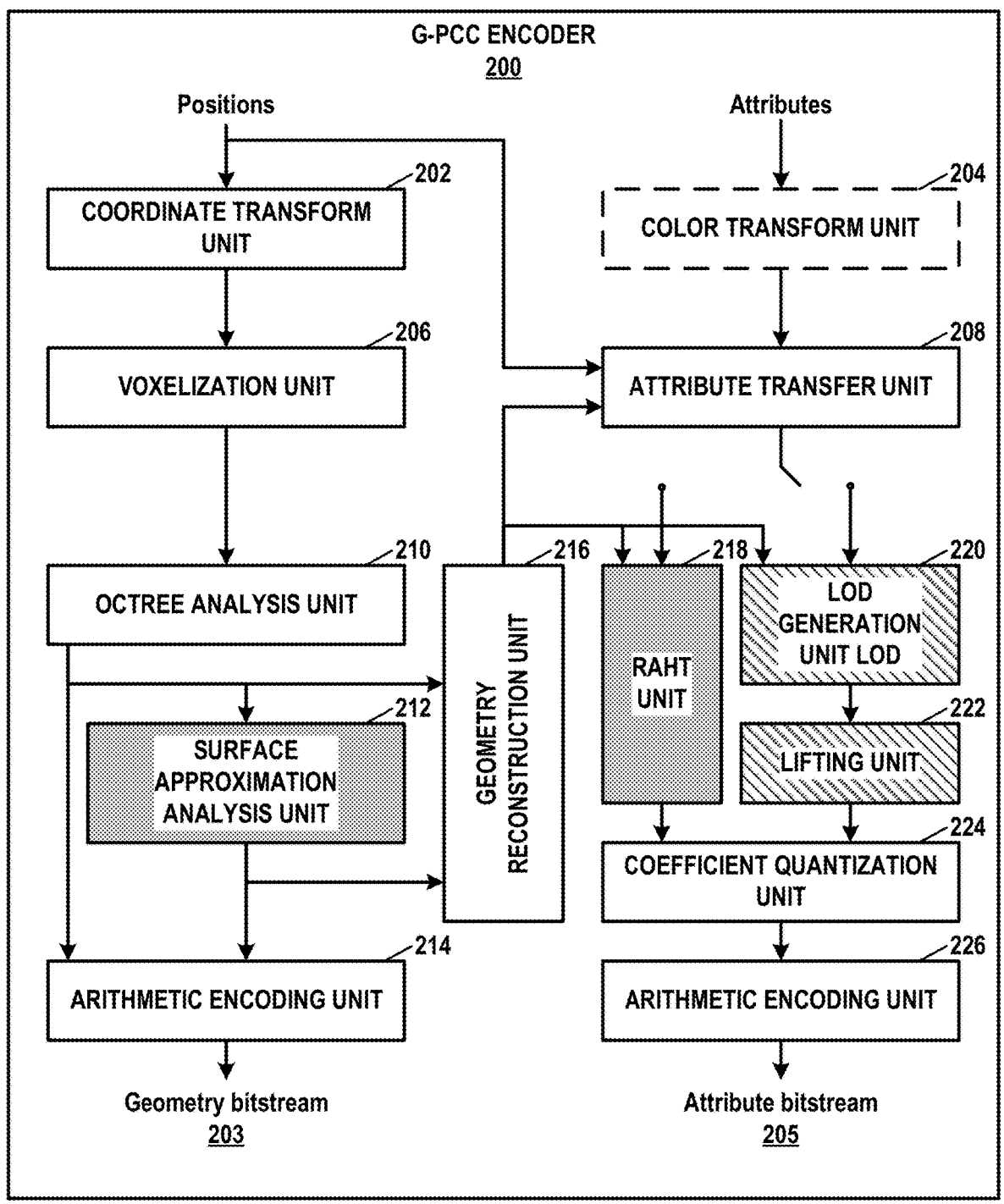
FIG. 2 is a block diagram illustrating an example Geometry-based Point Cloud Compression (G-PCC) encoder.
Figure 3:
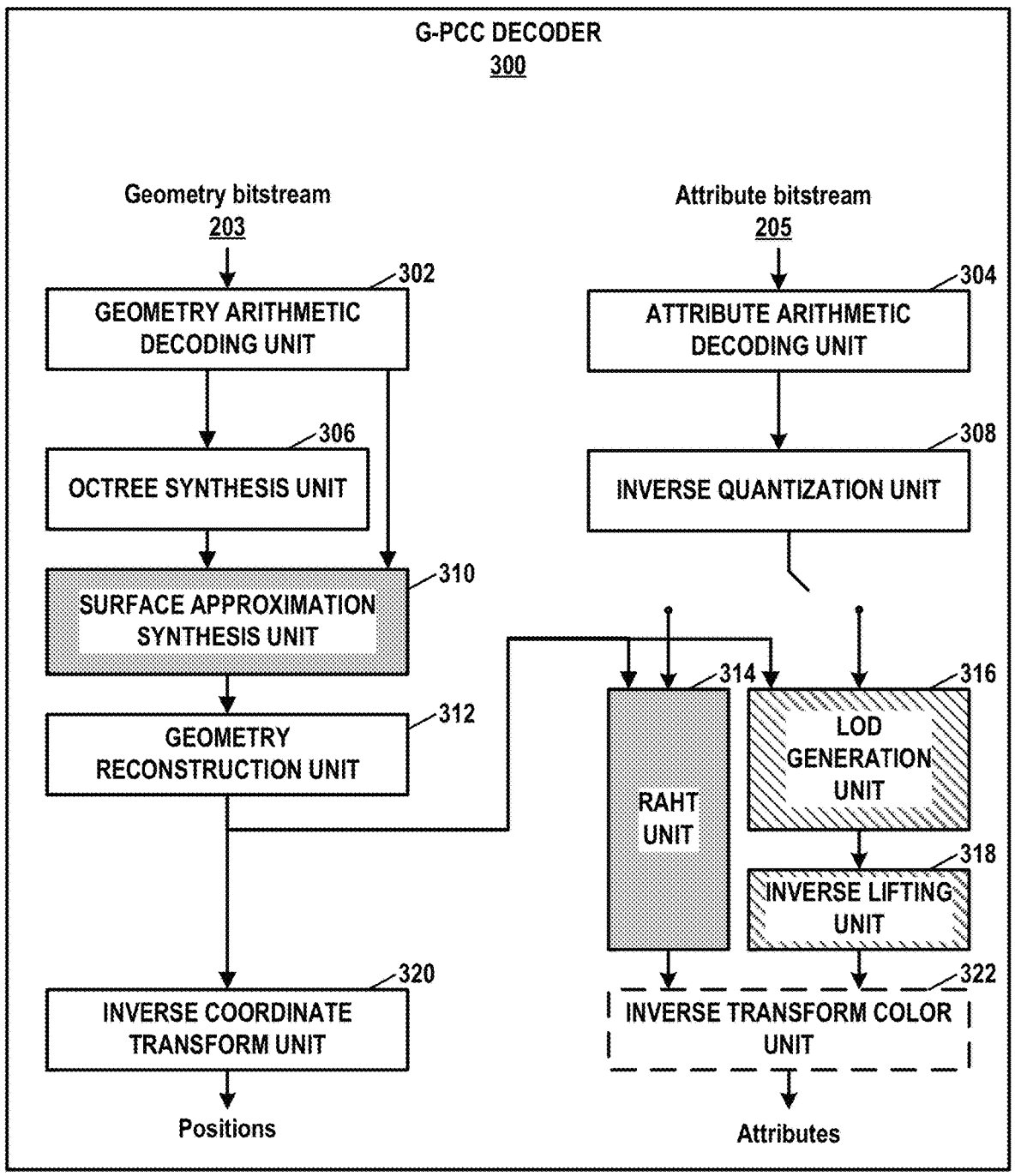
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec (e.g., as implemented by G-PCC encoder 200 and G-PCC decoder 300) also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbor prediction with an update/lifting step (Lifting Transform). RAHT and Lifting are typically used for Category 1 data, while Predicting is typically used for Category 3 data. However, either method may be used for any data, and, similar with the geometry codecs in G-PCC, the attribute coding method used to code the point cloud is specified in the bitstream.

The coding of the attributes may be conducted in a level-of-detail (LoD), where for each level of detail, a finer representation of the point cloud attribute may be obtained. Each level of detail may be specified based on a distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions of points of the point cloud and a set of attributes. G-PCC encoder 200 may obtain the set of positions of the points of the point cloud and the set of attributes from data source 104 (FIG. 1). The positions may include coordinates of points of a point cloud. The attributes may include information about the points of the point cloud, such as colors associated with points of the point cloud. G-PCC encoder 200 may generate a geometry bitstream 203 that includes an encoded representation of the positions of the points of the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform in order to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points of the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

As will be explained in more detail below, G-PCC encoder 200 may be configured to encode laser angles using one or more techniques of the disclosure. In one example of the disclosure, G-PCC encoder 200 may be configured to encode the point cloud data using a plurality of laser angles, and encode a plurality of syntax elements that indicate respective values of the plurality of laser angles in a sorted order according to a constraint.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points of a point cloud. Inverse transform coordinate unit 320 may apply an inverse transform to the reconstructed coordinates to convert the reconstructed coordinates (positions) of the points of the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

As will be explained in more detail below, G-PCC decoder 300 may be configured to decode laser angles using one or more techniques of the disclosure. For example, G-PCC decoder 300 may be configured to decode a plurality of syntax elements that indicate respective values of a plurality of laser angles in a sorted order according to a constraint, and decode the point cloud data using the plurality of laser angles.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

G-PCC Angular and Azimuthal Coding Modes

G-PCC encoder 200 and G-PCC decoder 300 may support the angular coding mode. The angular coding mode was adopted at the 129th MPEG meeting in Brussels, Belgium. The following descriptions are based on the original MPEG contributions documents Sebastien Lasserre, Jonathan Taquet, "[GPCC][CE 13.22 related] An improvement of the planar coding mode," ISO/IEC JTC1/SC29/WG11 MPEG/m50642, Geneva, CH, October 2019, and Sebastien Lasserre, Jonathan Taquet, "[GPCC] CE 13.22 report on angular mode," ISO/IEC JTC1/SC29/WG11 MPEG/m51594, Brussels, Belgium, January 2020, as well as the GPCC DIS text G-PCC DIS, ISO/IEC JTC1/SC29/WG11 w19328, Alpbach, Austria, June 2020.

Planar mode is a technique that may improve coding of which nodes are occupied. Planar mode may be used when all occupied child nodes of a node are adjacent to a plane and on a side of the plane associated with increasing coordinate values for a dimension orthogonal to the plane. For instance, planar mode may be used for a node when all occupied child nodes of the node are above or below a horizontal plane passing through a center point of the node, or planar mode may be used for a node when all occupied child nodes of the node are on a close side or a farther side of a vertical plane passing through the center point of the node. G-PCC encoder 200 may encode a plane position syntax element (i.e., a syntax element indicating a plane position) for each of an x, y, and z dimension. The plane position syntax element for a dimension indicates whether the plane orthogonal to the dimension is at a first position or a second position. If the plane is at the first position, the plane corresponds to a boundary of the node. If the plane is at the second position, the plane passes through a 3D center of the node. Thus, for the z-dimension, G-PCC encoder 200 or G-PCC decoder 300 may code a vertical plane position of a planar mode in a node of an octree that represents 3-dimensional positions of points of the point cloud.

Figure 4:
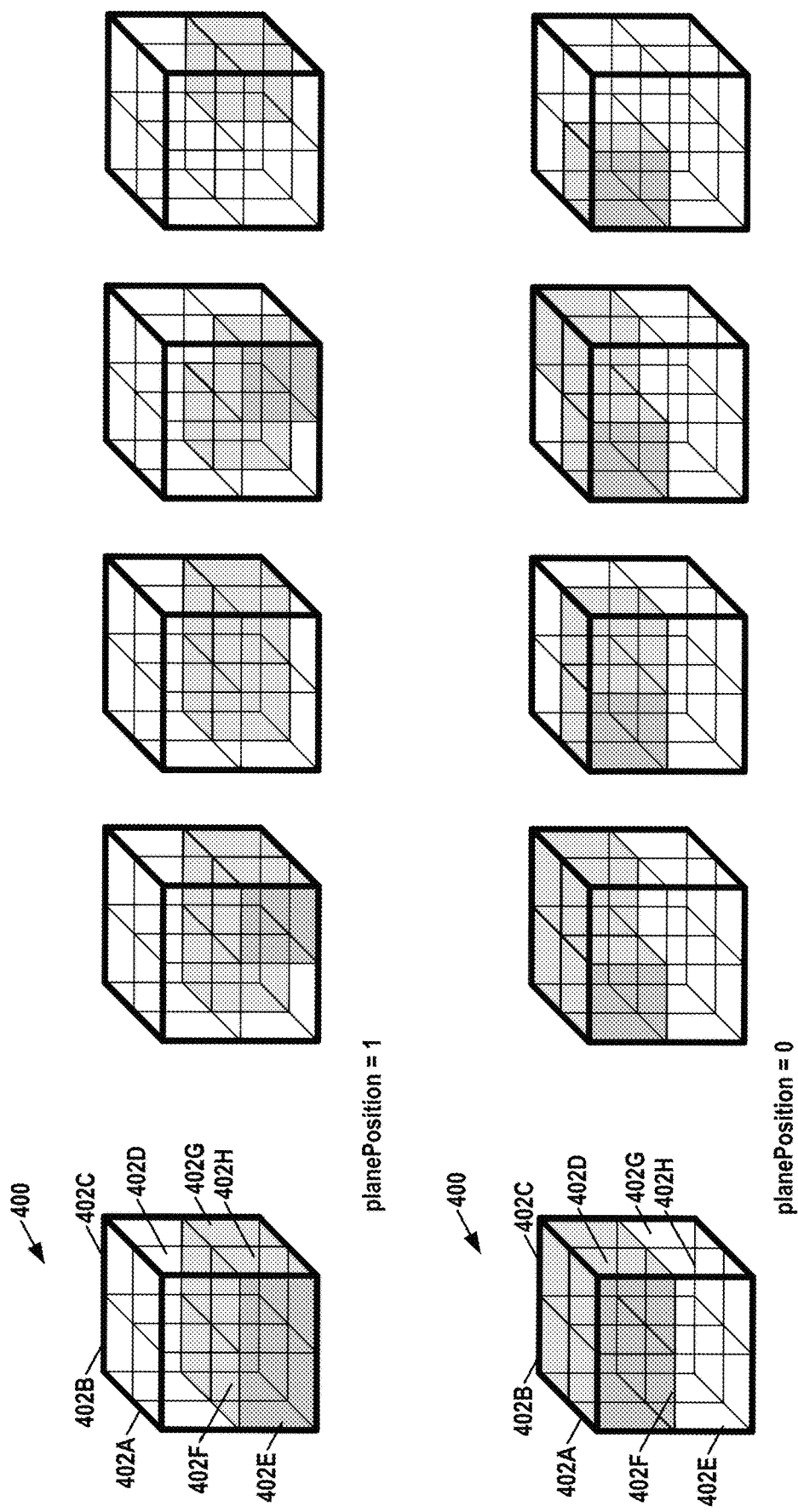
FIG. 4 is a conceptual diagram illustrating example planar occupancy in a vertical direction.

FIG. 4 is a conceptual diagram illustrating example planar occupancy in a vertical direction. In the example of FIG. 4, a node 400 is partitioned into eight child nodes 402A-402H (collectively, "child nodes 402"). Child nodes 402 may be occupied or unoccupied. In the example of FIG. 4, occupied child nodes are shaded. When one or more child nodes 402A-402D are occupied and none of child nodes 402E-402H are occupied, G-PCC encoder 200 may encode a plane position (planePosition) syntax element with a value of 0 to indicate that all occupied child nodes are adjacent on a positive side (i.e., a side of increasing z-coordinates) of a plane of the minimum z coordinate of node 400. When one or more child nodes 402E-402H are occupied and none of child nodes 402A-402D are occupied, G-PCC encoder 200 may encode a plane position (planePosition) syntax element with a value of 1 to indicate that all occupied child nodes are adjacent on a positive side of a plane of a midpoint z coordinate of node 400. In this way, the plane position syntax element may indicate a vertical plane position of a planar mode in node 400.

Figure 5:
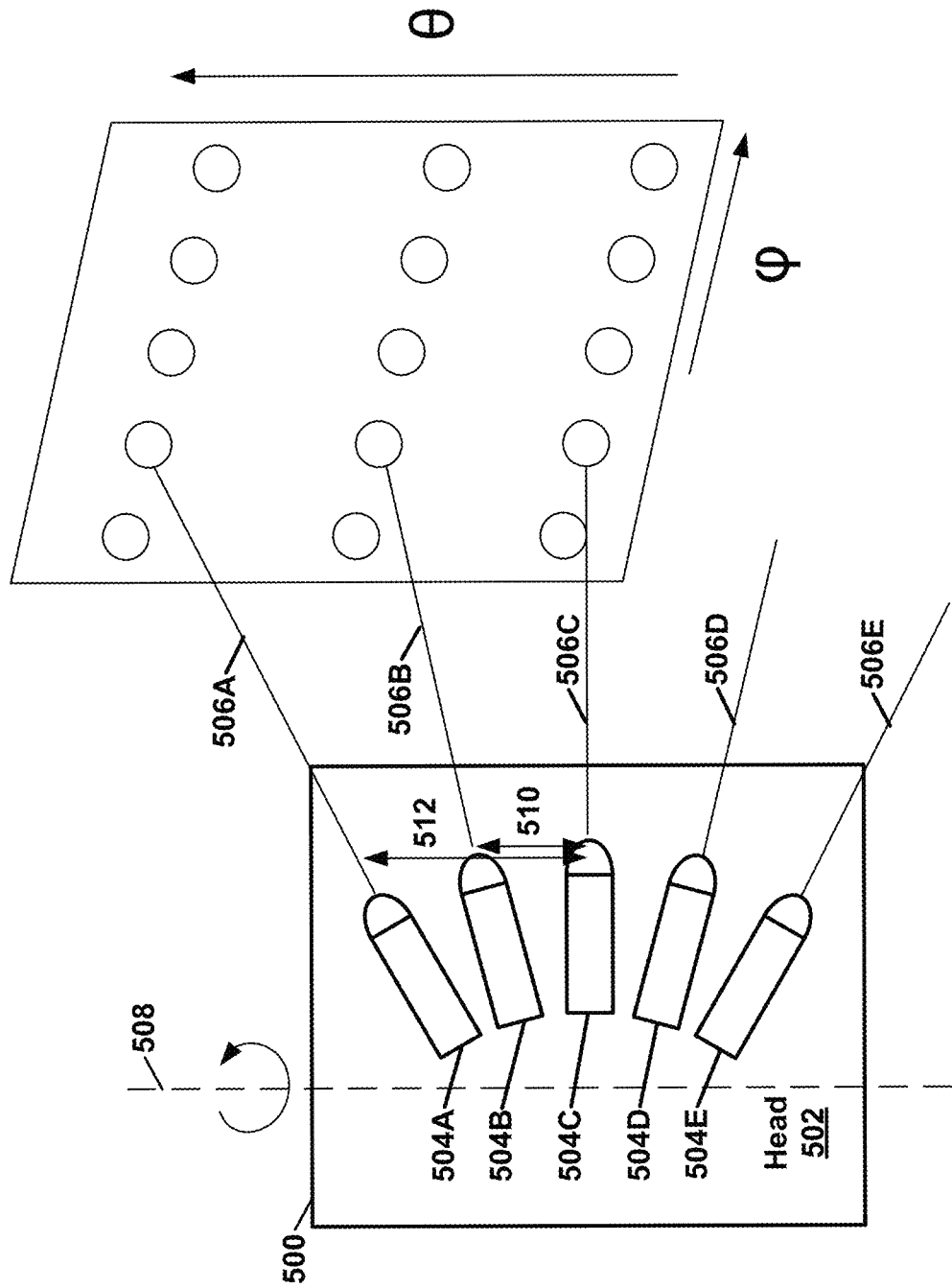
FIG. 5 is a conceptual diagram illustrating a light detection and ranging (LIDAR) sensor scanning points in 3-dimensional space.

Point clouds can often be captured using a LIDAR sensor or other laser-based sensor. For example, the sensor scans the points in 3D space, as shown in FIG. 5. FIG. 5 is a conceptual diagram illustrating a laser package 500, such as a LIDAR sensor or other system that includes one or more lasers, scanning points in 3-dimensional space. Data source 104 (FIG. 1) may include laser package 500. As shown in FIG. 5, point clouds can be captured using laser package 500, i.e., the sensor scans the points in 3D space. It is to be understood, however, that some point clouds are not generated by an actual LIDAR sensor but may be encoded as if they were. In the example of FIG. 5, laser package 500 includes a LIDAR head 502 that includes multiple lasers 504A-504E (collectively, "lasers 504") arrayed in a vertical plane at different angles relative to an origin point. Laser package 500 may rotate around a vertical axis 508. Laser package 500 may use returned laser light to determine the distances and positions of points of the point cloud. Laser beams 506A-506E (collectively, "laser beams 506") emitted by lasers 504 of laser package 500 may be characterized by a set of parameters. Distances denoted by arrows 510, 512 denotes an example of laser correction values for laser 504B, 504A, respective. As shown in FIG. 5, while capturing points, each laser 504 of laser package 500 rotates around a z axis 508. The information about how many probes (scanning instances) each of lasers 504 performs in one full turn (360 degrees), i.e., the information about scanning in azimuth or phi direction, can be used to improve the x and y plane position of planar mode, and similarly for x- and y-position bits for inferred direct coding mode (IDCM).

The angular coding mode is optionally used together with the planar mode (e.g., as described in Sebastien Lasserre, David Flynn, "[GPCC] Planar mode in octree-based geometry coding," ISO/IEC JTC1/SC29/WG11 MPEG/m48906, Gothenburg, Sweden, July 2019) and improves the coding of the vertical (z) plane position syntax element by employing knowledge of positions and elevation angles (represented using theta in FIG. 5) of sensing laser beams in a typical LIDAR sensor (e.g., see Sebastien Lasserre, Jonathan Taquet, "[GPCC] CE 13.22 report on angular mode," ISO/IEC JTC1/SC29/WG11 MPEG/m51594, Brussels, Belgium, January 2020). Furthermore, the angular coding mode can optionally be used to improve the coding of vertical z-position bits in inferred direct coding mode (IDCM). The angular coding mode is applied for nodes where the «angular size» node_size/r is small enough for the eligibility with r relative to the lidar head position ($x_{Lidar}$, $y_{Lidar}$, $z_{Lidar}$), i.e., if the angle is lower than the smallest angular delta between two laser |tan(θL1)–tan(θL2)|. Otherwise, for a bigger node, there may be multiple lasers passing through the node. Thus, in this case, the angular mode will not be efficient.

Figure 6:
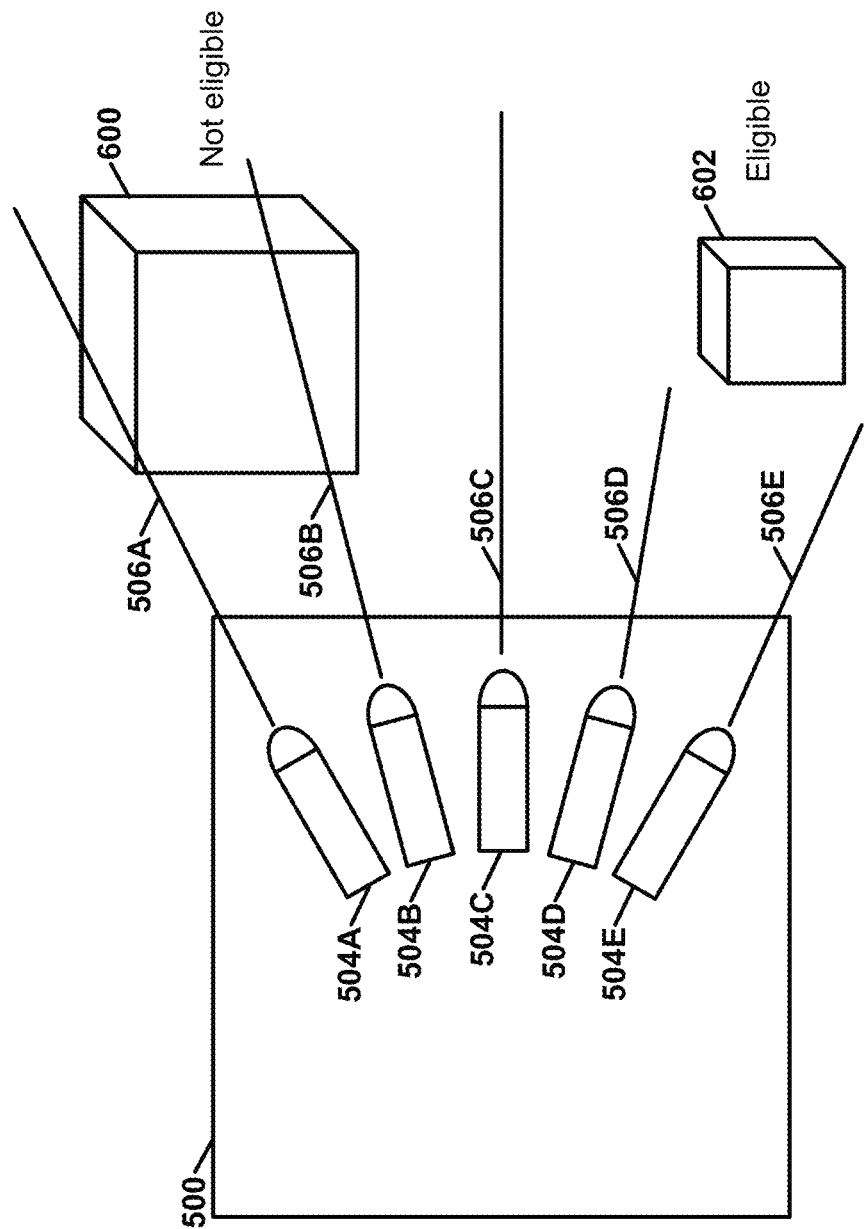
FIG. 6 is a conceptual diagram illustrating an example of angular eligibility of a node.

FIG. 6 is a conceptual diagram illustrating an example of angular eligibility of a node. In the example of FIG. 6, node 600 is determined to not be eligible because at least two of laser beams 506 intersect node 600. However, node 602 may be eligible for angular coding because node 602 is not intersected by two or more of laser beams 506.

While capturing points, each laser also rotates around a z axis (as shown in FIG. 5), and the information about how many probes (scanning instances) each laser performs in one full turn (360 degrees), i.e., the information about scanning in azimuth or phi direction, can be used to improve the x and y plane position of planar mode, and similarly for x- and y-position bits for IDCM (e.g., see Sebastien Lasserre, Jonathan Taquet, "[GPCC][CE 13.22 related] The new azimuthal coding mode," ISO/IEC JTC1/SC29/WG11 MPEG/m51596, Brussels, BE, January 2020).

Angular and Azimuthal Modes: Signaling of Sensor Laser Beams Parameters

The syntax elements that indicate the laser information that are used for the angular and azimuthal coding modes to obtain coding efficiency benefits are bolded in Table 1. The semantics of these syntax elements is specified, as follows, in G-PCC DIS, ISO/IEC JTC1/SC29/WG11 w19328, Alpbach, Austria, June 2020:

number_lasers_minus1 plus 1 specifies the number of lasers used for the angular coding mode. When not present, number_lasers_minus1 is inferred to be 0.

laser_angle[i] and laser_angle_diff[i], for i in the range 0 . . . number_lasers_minus1, specify the tangent of the elevation angle of the i-th laser relative to the horizontal plane defined by the first and second coded axes. When not present, laser_angle[i] is inferred to be 0.

laser_correction[i] and laser_correction_diff[i], for i in the range 0 . . . number_lasers_minus1, specifies the correction, along the second internal axis, of the i-th laser position relative to the geomAngularOrigin[2]. When not present, laser_correction[i] is inferred to be 0.

The arrays LaserAngle and LaserCorrection, with elements laserAngle[i] and LaserCorrection[i], for i in the range of 0 . . . number_lasers_minus1, are derived as follows:

```
LaserAngle[0] = laser_angle[0]
LaserCorrection[0] = laser_correction[0]
for (i = 1; i <= number_lasers_minus1; i++) {
    LaserAngle[i] = LaserAngle[i − 1] + laser_angle_diff[i]
    LaserCorrection[i] = LaserCorrection[i − 1] +
    laser_correction_diff[i]
}
``` laser_numphi_perturn[i] for i in the range 0 . . . number_lasers_minus1, specify the number of probe in the azimuth direction for one full rotation of the i-th laser. When not present, laser_numphi_perturn[i] is inferred to be 0.

TABLE 1

Geometry parameter set syntax. Angular and
azimuthal mode syntax elements are bolded.

| | Descriptor |
|---|---|
| geometry_parameter_set( ) { | |
|   gps_geom_parameter_set_id | ue(v) |
|   gps_seq_parameter_set_id | ue(v) |
|   gps_gsh_box_log2_scale_present_flag | u(1) |
|   if( !gps_gsh_box_log2_scale_present_flag) | |
|     gps_gs_box_log2_scale | ue(v) |
|   unique_geometry_points_flag | u(1) |
|   geometry_planar_mode_flag | u(1) |
|   if( geometry_planar_mode_flag ){ | |
|     geom_planar_mode_th_idcm | ue(v) |
|     geom_planar_mode_th[ 0 ] | ue(v) |
|     geom_planar_mode_th[ 1 ] | ue(v) |
|     geom_planar_mode_th[ 2 ] | ue(v) |
|     geometry_angular_mode_flag | u(1) |
|   } | |
|   if( geometry_angular_mode_flag ){ | |
|     for( k = 0; k < 3; k++ ) | |
|       geom_angular_origin_xyz[ k ] | se(v) |
|     number_lasers_minus1 | ue(v) |
|     laser_angle[ 0 ] | se(v) |
|     laser_correction[ 0 ] | se(v) |
|       laser_numphi_perturn[0] | ue(v) |
|     for( i = 1; i <= number_lasers_minus1; i++ ) { | |
|       laser_angle_diff[ i ] | ue(v) |
|       laser_correction_diff[ i ] | se(v) |
|         laser_numphi_perturn[ i ] | ue(v) |
|     } | |
|     planar_buffer_disabled_flag | u(1) |
|   } | |
|   neighbour_context_restriction_flag | u(1) |
|   inferred_direct_coding_mode_enabled_flag | u(1) |
|   bitwise_occupancy_coding_flag | u(1) |
|   adjacent_child_contextualization_enabled_flag | u(1) |
|   log2_neighbour_avail_boundary | ue(v) |
|   log2_intra_pred_max_node_size | ue(v) |
|   log2_trisoup_node_size | ue(v) |
|   geom_scaling_enabled_flag | u(1) |
|   if( geom_scaling_enabled_flag ) | |
|     geom_base_qp_minus4 | ue(v) |
|   geom_tree_coded_axis_list_present_flag | u(1) |
|   gps_extension_flag | u(1) |
|   if( gps_extension_flag) | |
|     while( more_data_in_byte_stream( ) ) | |
|       gps_extension_data_flag | u(1) |
|   byte_alignment( ) | |
| } | |

The signaling mechanism used to indicate the laser angles in the bitstream may specify the laser angles in any order. Unsorted laser angles may present drawbacks in the decoding process relative to sorted laser angles. A sorted order of laser angles is beneficial when searching for a laser angle that is closest to a particular point/node in the point cloud. Several search algorithms (e.g., binary search, jump search, interpolation search, and/or exponential search) can improve the speed of the search if the laser angles are sorted. If the laser angles are not signaled in a sorted fashion, G-PCC decoder 300 may have to perform a brute-force search method, or G-PCC decoder 300 may be configured to explicitly sort the laser angles and then conduct the search. Explicitly sorting the laser angles is an additional burden to G-PCC decoder 300. If the laser angles are signaled in the sorted fashion, G-PCC decoder 300 can avoid explicit sorting of laser angles, thus improving the speed of decoding and reducing decoder complexity.

In view of these drawbacks, this disclosure proposes that G-PCC encoder 200 and G-PCC decoder 300 operate according to a constraint that the laser angles are signaled in the sorted order. In other words, the laser angles derived from the signaled syntax elements (e.g., the syntax elements described above) should follow a sorted order. The sorted order may be an ascending order or a descending order. While some example techniques of this disclosure are described with respect to angular and azimuthal modes, the techniques of this disclosure may be used with any coding modes that use laser angles.

Accordingly, in one example of the disclosure, G-PCC encoder 200 may be configured to encode a point cloud data using a plurality of laser angles, and encode a plurality of syntax elements that indicate respective values of the plurality of laser angles in a sorted order according to a constraint. An example of such a constraint is as follows:

It is a requirement of bitstream conformance that for i=1 . . . num_lasers_minus1, inclusive, the value of LaserAngle[i] shall be greater than or equal to LaserAngle[i−1].

This constraint causes the sorted order to be ascending.

In another example, G-PCC encoder 200 and G-PCC decoder 300 may operate according to the following constraint:

It is a requirement of bitstream conformance that for i=1. . . num_lasers_minus1, inclusive, the value of LaserAngle[i ] shall be less than or equal to LaserAngle[i−1].

This constraint causes the sorted order to be descending.

In a reciprocal fashion, G-PCC decoder 300 may be configured to decode a plurality of syntax elements that indicate respective values of a plurality of laser angles in a sorted order according to a constraint, and decode the point cloud data using the plurality of laser angles.

Figure 7:
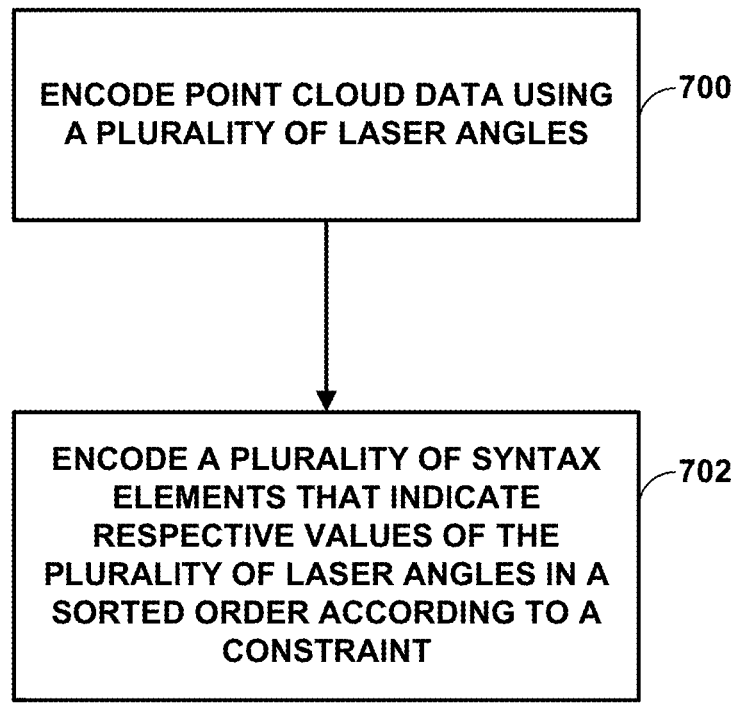
FIG. 7 is a flowchart illustrating an example encoding method of the disclosure.

FIG. 7 is a flowchart illustrating an example encoding method of the disclosure. The techniques of FIG. 7 may be performed by one or more structural components of G-PCC encoder 200. In one example of the disclosure, G-PCC encoder 200 may be configured to encode point cloud data using a plurality of laser angles (700), and encode a plurality of syntax elements that indicate respective values of the plurality of laser angles in a sorted order according to a constraint (702). In one example, the sorted order is an ascending order. In another example, the sorted order is a descending order.

In one example, the plurality of syntax elements comprise a plurality of LaserAngle[i] syntax elements, where i specifies a respective laser angle of the plurality of laser angles. The constraint may specify that a value of LaserAngle[i] shall be greater than or equal to a value of LaserAngle [i−1]. In another example, LaserAngle[i] may be derived from other syntax elements (e.g., syntax elements indicating different of adjacent laser angles, e.g., delta coded laser angles) and the constraint indirectly applies to the syntax elements such that the derived LaserAngle[ ] follows the constraint.

In one example, to encode the plurality of syntax elements that indicate the respective values of the plurality of laser angles, G-PCC encoder 200 is further configured to encode at least one respective value of the plurality of laser angles as a delta value relative to another laser angle. In another example, to encode the point cloud data using the plurality of laser angles, G-PCC encoder 200 is further configured to encode the point cloud using a binary search process and the plurality of laser angles in the sorted order.

Figure 8:
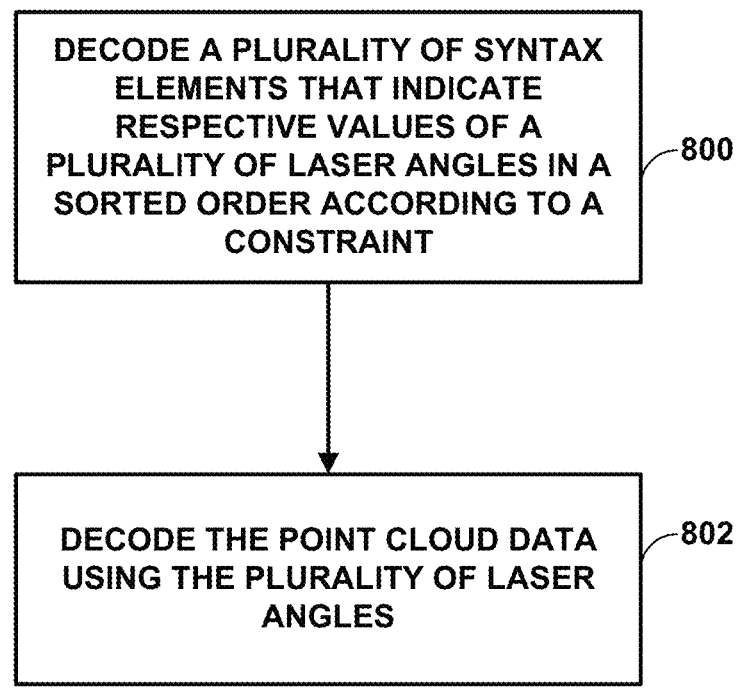
FIG. 8 is a flowchart illustrating an example decoding method of the disclosure.

FIG. 8 is a flowchart illustrating an example decoding method of the disclosure. The techniques of FIG. 8 may be performed by one or more structural components of G-PCC decoder 300. In one example of the disclosure, G-PCC decoder 300 may be configured to decode a plurality of syntax elements that indicate respective values of a plurality of laser angles in a sorted order according to a constraint (800), and decode the point cloud data using the plurality of laser angles (802). In one example, the sorted order is an ascending order. In another example, the sorted order is a descending order.

In one example, the plurality of syntax elements comprise a plurality of LaserAngle[i] syntax elements, where i specifies a respective laser angle of the plurality of laser angles. The constraint may specify that a value of LaserAngle[i] shall be greater than or equal to a value of LaserAngle [i−1].

In one example, to decode the plurality of syntax elements that indicate the respective values of the plurality of laser angles, G-PCC decoder 300 is further configured to decode at least one respective value of the plurality of laser angles as a delta value relative to another laser angle. In another example, to decode the point cloud data using the plurality of laser angles, G-PCC decoder 300 is further configured to decode the point cloud using a binary search process and the plurality of laser angles in the sorted order.

Figure 9:
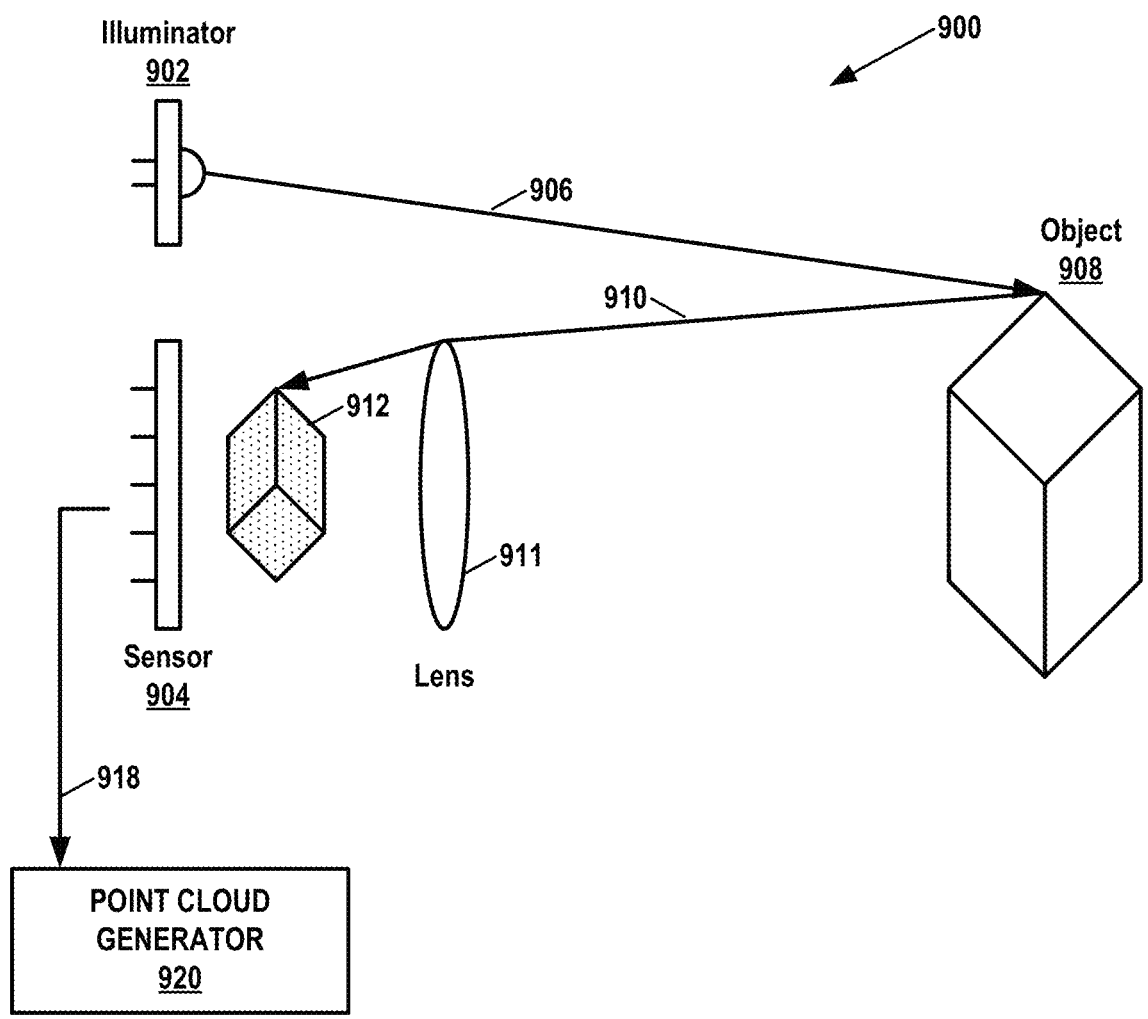
FIG. 9 is a conceptual diagram illustrating an example range-finding system that may be used with one or more techniques of this disclosure.

FIG. 9 is a conceptual diagram illustrating an example range-finding system 900 that may be used with one or more techniques of this disclosure. In the example of FIG. 9, range-finding system 900 includes an illuminator 902 and a sensor 904. Illuminator 902 may emit light 906. In some examples, illuminator 902 may emit light 906 as one or more laser beams. Light 906 may be in one or more wavelengths, such as an infrared wavelength or a visible light wavelength. In other examples, light 906 is not coherent, laser light. When light 906 encounters an object, such as object 908, light 906 creates returning light 910. Returning light 910 may include backscattered and/or reflected light. Returning light 910 may pass through a lens 911 that directs returning light 910 to create an image 912 of object 908 on sensor 904. Sensor 904 generates signals 914 based on image 912. Image 912 may comprise a set of points (e.g., as represented by dots in image 912 of FIG. 9).

In some examples, illuminator 902 and sensor 904 may be mounted on a spinning structure so that illuminator 902 and sensor 904 capture a 360-degree view of an environment. In other examples, range-finding system 900 may include one or more optical components (e.g., mirrors, collimators, diffraction gratings, etc.) that enable illuminator 902 and sensor 904 to detect objects within a specific range (e.g., up to 360-degrees). Although the example of FIG. 9 only shows a single illuminator 902 and sensor 904, range-finding system 900 may include multiple sets of illuminators and sensors.

In some examples, illuminator 902 generates a structured light pattern. In such examples, range-finding system 900 may include multiple sensors 904 upon which respective images of the structured light pattern are formed. Range-finding system 900 may use disparities between the images of the structured light pattern to determine a distance to an object 908 from which the structured light pattern backscatters. Structured light-based range-finding systems may have a high level of accuracy (e.g., accuracy in the sub-millimeter range), when object 908 is relatively close to sensor 904 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 900 is a time of flight (ToF)-based system. In some examples where range-finding system 900 is a ToF-based system, illuminator 902 generates pulses of light. In other words, illuminator 902 may modulate the amplitude of emitted light 906. In such examples, sensor 904 detects returning light 910 from the pulses of light 906 generated by illuminator 902. Range-finding system 900 may then determine a distance to object 908 from which light 906 backscatters based on a delay between when light 906 was emitted and detected and the known speed of light in air. In some examples, rather than (or in addition to) modulating the amplitude of the emitted light 906, illuminator 902 may modulate the phase of the emitted light 906. In such examples, sensor 904 may detect the phase of returning light 910 from object 908 and determine distances to points on object 908 using the speed of light and based on time differences between when illuminator 902 generated light 906 at a specific phase and when sensor 904 detected returning light 910 at the specific phase.

In other examples, a point cloud may be generated without using illuminator 902. For instance, in some examples, sensor 904 of range-finding system 900 may include two or more optical cameras. In such examples, range-finding system 900 may use the optical cameras to capture stereo images of the environment, including object 908. Range-finding system 900 (e.g., point cloud generator 920) may then calculate the disparities between locations in the stereo images. Range-finding system 900 may then use the disparities to determine distances to the locations shown in the stereo images. From these distances, point cloud generator 920 may generate a point cloud.

Sensors 904 may also detect other attributes of object 908, such as color and reflectance information. In the example of FIG. 9, a point cloud generator 920 may generate a point cloud based on signals 918 generated by sensor 904. Range-finding system 900 and/or point cloud generator 920 may form part of data source 104 (FIG. 1).

Figure 10:
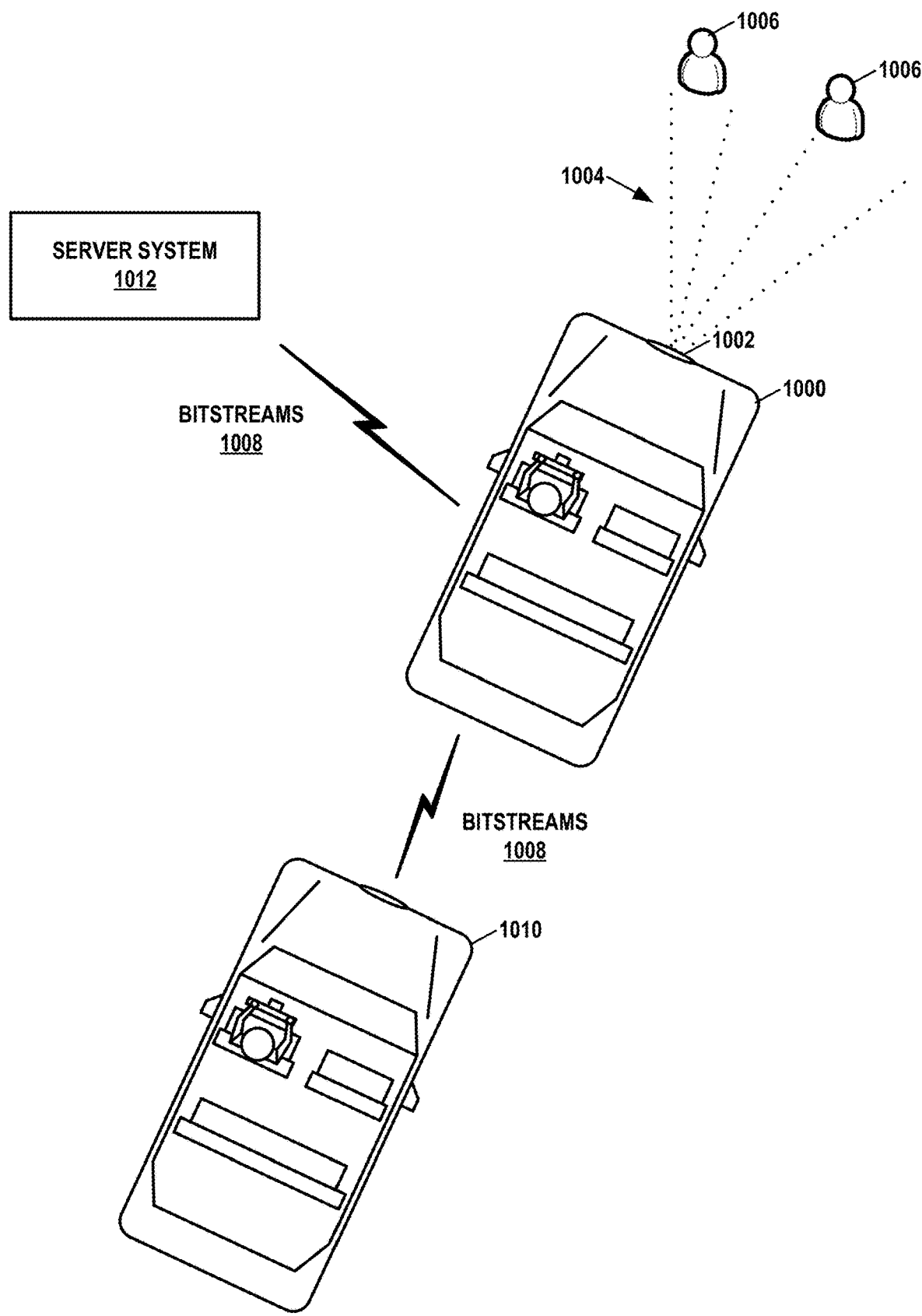
FIG. 10 is a conceptual diagram illustrating an example vehicle-based scenario in which one or more techniques of this disclosure may be used.

FIG. 10 is a conceptual diagram illustrating an example vehicle-based scenario in which one or more techniques of this disclosure may be used. In the example of FIG. 10, a vehicle 1000 includes a laser package 1002, such as a LIDAR system. Laser package 1002 may be implemented in the same manner as laser package 500 (FIG. 5). Although not shown in the example of FIG. 10, vehicle 1000 may also include a data source, such as data source 104 (FIG. 1), and a G-PCC encoder, such as G-PCC encoder 200 (FIG. 1). In the example of FIG. 10, laser package 1002 emits laser beams 1004 that reflect off pedestrians 1006 or other objects in a roadway. The data source of vehicle 1000 may generate a point cloud based on signals generated by laser package 1002. The G-PCC encoder of vehicle 1000 may encode the point cloud to generate bitstreams 1008, such as geometry bitstream 203 (FIG. 2) and attribute bitstream 205 (FIG. 2). Bitstreams 1008 may include many fewer bits than the unencoded point cloud obtained by the G-PCC encoder. An output interface of vehicle 1000 (e.g., output interface 108 (FIG. 1) may transmit bitstreams 1008 to one or more other devices. Thus, vehicle 1000 may be able to transmit bitstreams 1008 to other devices more quickly than the unencoded point cloud data. Additionally, bitstreams 1008 may require less data storage capacity.

In the example of FIG. 10, vehicle 1000 may transmit bitstreams 1008 to another vehicle 1010. Vehicle 1010 may include a G-PCC decoder, such as G-PCC decoder 300 (FIG. 1). The G-PCC decoder of vehicle 1010 may decode bitstreams 1008 to reconstruct the point cloud. Vehicle 1010 may use the reconstructed point cloud for various purposes. For instance, vehicle 1010 may determine based on the reconstructed point cloud that pedestrians 1006 are in the roadway ahead of vehicle 1000 and therefore start slowing down, e.g., even before a driver of vehicle 1010 realizes that pedestrians 1006 are in the roadway. Thus, in some examples, vehicle 1010 may perform an autonomous navigation operation, generate a notification or warning, or perform another action based on the reconstructed point cloud.

Additionally or alternatively, vehicle 1000 may transmit bitstreams 1008 to a server system 1012. Server system 1012 may use bitstreams 1008 for various purposes. For example, server system 1012 may store bitstreams 1008 for subsequent reconstruction of the point clouds. In this example, server system 1012 may use the point clouds along with other data (e.g., vehicle telemetry data generated by vehicle 1000) to train an autonomous driving system. In other example, server system 1012 may store bitstreams 1008 for subsequent reconstruction for forensic crash investigations (e.g., if vehicle 1000 collides with pedestrians 1006).

Figure 11:
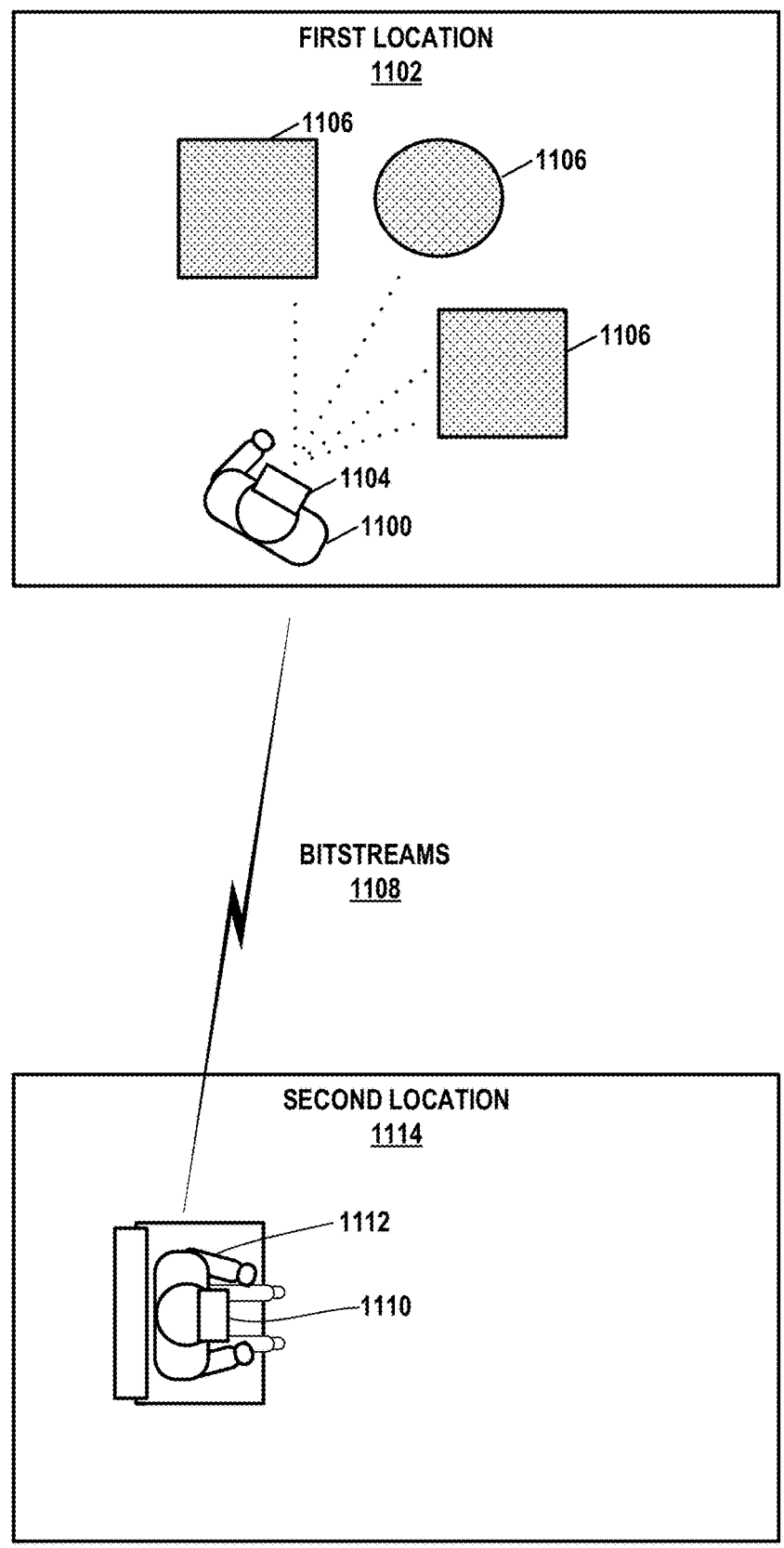
FIG. 11 is a conceptual diagram illustrating an example extended reality system in which one or more techniques of this disclosure may be used.

FIG. 11 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 11, a first user 1100 is located in a first location 1102. User 1100 wears an XR headset 1104. As an alternative to XR headset 1104, user 1100 may use a mobile device (e.g., mobile phone, tablet computer, etc.). XR headset 1104 includes a depth detection sensor, such as a LIDAR system, that detects positions of points on objects 1106 at location 1102. A data source of XR headset 1104 may use the signals generated by the depth detection sensor to generate a point cloud representation of objects 1106 at location 1102. XR headset 1104 may include a G-PCC encoder (e.g., G-PCC encoder 200 of FIG. 1) that is configured to encode the point cloud to generate bitstreams 1108.

XR headset 1104 may transmit bitstreams 1108 (e.g., via a network such as the Internet) to an XR headset 1110 worn by a user 1112 at a second location 1114. XR headset 1110 may decode bitstreams 1108 to reconstruct the point cloud. XR headset 1110 may use the point cloud to generate an XR visualization (e.g., an AR, MR, VR visualization) representing objects 1106 at location 1102. Thus, in some examples, such as when XR headset 1110 generates a VR visualization, user 1112 at location 1114 may have a 3D immersive experience of location 1102. In some examples, XR headset 1110 may determine a position of a virtual object based on the reconstructed point cloud. For instance, XR headset 1110 may determine, based on the reconstructed point cloud, that an environment (e.g., location 1102) includes a flat surface and then determine that a virtual object (e.g., a cartoon character) is to be positioned on the flat surface. XR headset 1110 may generate an XR visualization in which the virtual object is at the determined position. For instance, XR headset 1110 may show the cartoon character sitting on the flat surface.

Figure 12:
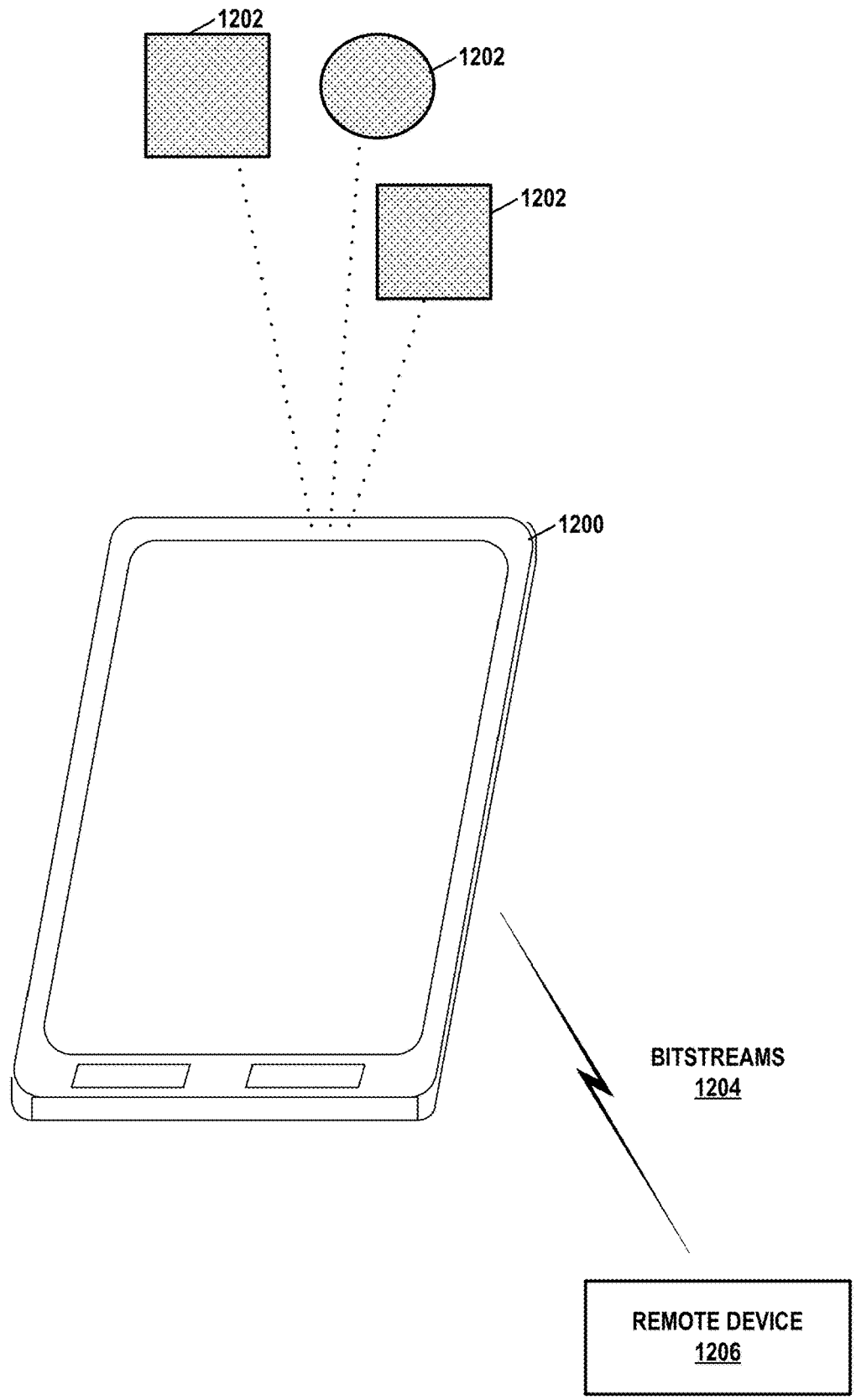
FIG. 12 is a conceptual diagram illustrating an example mobile device system in which one or more techniques of this disclosure may be used.

FIG. 12 is a conceptual diagram illustrating an example mobile device system in which one or more techniques of this disclosure may be used. In the example of FIG. 12, a mobile device 1200, such as a mobile phone or tablet computer, includes a depth detection sensor, such as a LIDAR system, that detects positions of points on objects 1202 in an environment of mobile device 1200. A data source of mobile device 1200 may use the signals generated by the depth detection sensor to generate a point cloud representation of objects 1202. Mobile device 1200 may include a G-PCC encoder (e.g., G-PCC encoder 200 of FIG. 1) that is configured to encode the point cloud to generate bitstreams 1204. In the example of FIG. 12, mobile device 1200 may transmit bitstreams to a remote device 1206, such as a server system or other mobile device. Remote device 1206 may decode bitstreams 1204 to reconstruct the point cloud. Remote device 1206 may use the point cloud for various purposes. For example, remote device 1206 may use the point cloud to generate a map of environment of mobile device 1200. For instance, remote device 1206 may generate a map of an interior of a building based on the reconstructed point cloud. In another example, remote device 1206 may generate imagery (e.g., computer graphics) based on the point cloud. For instance, remote device 1206 may use points of the point cloud as vertices of polygons and use color attributes of the points as the basis for shading the polygons. In some examples, remote device 1206 may perform facial recognition using the point cloud.

The following is a non-limiting list of aspects that may be in accordance with one or more techniques of this disclosure.

Aspect 1A—A method of coding point cloud data, the method comprising: coding laser angles in a sorted order according to a constraint; and coding the point cloud data using the laser angles.

Aspect 2A—The method of Aspect 1A, further comprising generating the point cloud.

Aspect 3A—A device for processing a point cloud, the device comprising one or more means for performing the method of any of Aspects 1A-2A.

Aspect 4A—The device of Aspect 3A, wherein the one or more means comprise one or more processors implemented in circuitry.

Aspect 5A—The device of any of Aspects 3A or 4A, further comprising a memory to store the data representing the point cloud.

Aspect 6A—The device of any of Aspects 3A-5A, wherein the device comprises a decoder.

Aspect 7A—The device of any of Aspects 3A-6A, wherein the device comprises an encoder.

Aspect 8A—The device of any of Aspects 3A-7A, further comprising a device to generate the point cloud.

Aspect 9A—The device of any of Aspects 3A-8A, further comprising a display to present imagery based on the point cloud.

Aspect 10A—A computer-readable storage medium having stored thereon instructions that, when executed, cause one or more processors to perform the method of any of Aspects 1A-2A.

Aspect 1B—A method of encoding point cloud data, the method comprising: encoding the point cloud data using a plurality of laser angles; and encoding a plurality of syntax elements that indicate respective values of the plurality of laser angles in a sorted order according to a constraint.

Aspect 2B—The method of Aspect 1B, wherein the sorted order is an ascending order.

Aspect 3B—The method of Aspect 1B, wherein the sorted order is an descending order.

Aspect 4B—The method of any of Aspects 1B-3B, wherein the plurality of syntax elements comprise a plurality of LaserAngle[i] syntax elements, where i specifies a respective laser angle of the plurality of laser angles.

Aspect 5B—The method of Aspect 4B, wherein the constraint specifies that a value of LaserAngle[i] shall be greater than or equal to a value of LaserAngle [i−1].

Aspect 6B—The method of any of Aspects 1B-5B, encoding the plurality of syntax elements that indicate the respective values of the plurality of laser angles comprises: encoding at least one respective value of the plurality of laser angles as a delta value relative to another laser angle.

Aspect 7B—The method of any of Aspects 1B-6B, wherein encoding the point cloud data using the plurality of laser angles comprises: encoding the point cloud using a binary search process and the plurality of laser angles in the sorted order.

Aspect 8B—An apparatus configured to encode point cloud data, the apparatus comprising: a memory configured to store the point cloud data; and one or more processors implemented in circuitry and in communication with the memory, the one or more processors configured to: encode the point cloud data using a plurality of laser angles; and encode a plurality of syntax elements that indicate respective values of the plurality of laser angles in a sorted order according to a constraint.

Aspect 9B—The apparatus of Aspect 8B, wherein the sorted order is an ascending order.

Aspect 10B—The apparatus of Aspect 8B, wherein the sorted order is an descending order.

Aspect 11B—The apparatus of any of Aspects 8B-10B, wherein the plurality of syntax elements comprise a plurality of LaserAngle[i] syntax elements, where i specifies a respective laser angle of the plurality of laser angles.

Aspect 12B—The apparatus of Aspect 11B, wherein the constraint specifies that a value of LaserAngle[i] shall be greater than or equal to a value of LaserAngle [i−1].

Aspect 13B—The apparatus of any of Aspects 8B-12B, wherein to encode the plurality of syntax elements that indicate the respective values of the plurality of laser angles, the one or more processors are further configured to: encode at least one respective value of the plurality of laser angles as a delta value relative to another laser angle.

Aspect 14B—The apparatus of any of Aspects 8B-13B, wherein to encode the point cloud data using the plurality of laser angles, the one or more processors are further configured to: encode the point cloud using a binary search process and the plurality of laser angles in the sorted order.

Aspect 15B—The apparatus of any of Aspects 8B-14B, further comprising: a sensor configured to capture the point cloud data.

Aspect 16B—A method of decoding point cloud data, the method comprising: decoding a plurality of syntax elements that indicate respective values of a plurality of laser angles in a sorted order according to a constraint; and decoding the point cloud data using the plurality of laser angles.

Aspect 17B—The method of Aspect 16B, wherein the sorted order is an ascending order.

Aspect 18B—The method of Aspect 16B, wherein the sorted order is an descending order.

Aspect 19B—The method of any of Aspects 16B-18B, wherein the plurality of syntax elements comprise a plurality of LaserAngle[i] syntax elements, where i specifies a respective laser angle of the plurality of laser angles.

Aspect 20B—The method of Aspect 19B, wherein the constraint specifies that a value of LaserAngle[i] shall be greater than or equal to a value of LaserAngle [i−1].

Aspect 21B—The method of any of Aspects 16B-20B, decoding the plurality of syntax elements that indicate the respective values of the plurality of laser angles comprises: decoding at least one respective value of the plurality of laser angles as a delta value relative to another laser angle.

Aspect 22B—The method of any of Aspects 16B-21B, wherein decoding the point cloud data using the plurality of laser angles comprises: decoding the point cloud using a binary search process and the plurality of laser angles in the sorted order.

Aspect 23B—An apparatus configured to decode point cloud data, the apparatus comprising: a memory configured to store the point cloud data; and one or more processors implemented in circuitry and in communication with the memory, the one or more processors configured to: decode a plurality of syntax elements that indicate respective values of a plurality of laser angles in a sorted order according to a constraint; and decode the point cloud data using the plurality of laser angles.

Aspect 24B—The apparatus of Aspect 23B, wherein the sorted order is an ascending order.

Aspect 25B—The apparatus of Aspect 23B, wherein the sorted order is an descending order.

Aspect 26B—The apparatus of any of Aspects 23B-25B, wherein the plurality of syntax elements comprise a plurality of LaserAngle[i] syntax elements, where i specifies a respective laser angle of the plurality of laser angles.

Aspect 27B—The apparatus of Aspect 26B, wherein the constraint specifies that a value of LaserAngle[i] shall be greater than or equal to a value of LaserAngle [i−1].

Aspect 28B—The apparatus of any of Aspects 23B-27B, wherein to decode the plurality of syntax elements that indicate the respective values of the plurality of laser angles, the one or more processors are further configured to: decode at least one respective value of the plurality of laser angles as a delta value relative to another laser angle.

Aspect 29B—The apparatus of any of Aspects 23B-28B, wherein to decode the point cloud data using the plurality of laser angles, the one or more processors are further configured to: decode the point cloud using a binary search process and the plurality of laser angles in the sorted order.

Aspect 30B—The apparatus of any of Aspects 23B-29B, further comprising: a display configured to display the decoded point cloud data.

Examples in the various aspects of this disclosure may be used individually or in any combination.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding point cloud data, the method comprising:
    encoding the point cloud data using a plurality of elevation laser angles; and encoding a plurality of syntax elements that indicate respective values of the plurality of elevation laser angles,
    wherein the plurality of syntax elements are encoded in a sorted order according to a constraint.

2. The method of claim 1, wherein the sorted order is an ascending order.

3. The method of claim 1, wherein the sorted order is an descending order.

4. The method of claim 1, wherein the plurality of syntax elements comprise a plurality of LaserAngle[i] syntax elements, where i specifies a respective elevation laser angle of the plurality of elevation laser angles.

5. The method of claim 4, wherein the constraint specifies that a value of LaserAngle[i] shall be greater than or equal to a value of LaserAngle [i-1].

6. The method of claim 1, wherein encoding the plurality of syntax elements that indicate the respective values of the plurality of elevation laser angles comprises:
    encoding at least one respective value of the plurality of elevation laser angles as a delta value relative to another elevation laser angle.

7. The method of claim 1, wherein encoding the point cloud data using the plurality of elevation laser angles comprises:
    encoding the point cloud using a binary search process and the plurality of elevation laser angles in the sorted order.

8. An apparatus configured to encode point cloud data, the apparatus comprising: a memory configured to store the point cloud data; and
    one or more processors implemented in circuitry and in communication with the memory, the one or more processors configured to:
        encode the point cloud data using a plurality of elevation laser angles; and
        encode a plurality of syntax elements that indicate respective values of the plurality of elevation laser angles, wherein the plurality of syntax elements are encoded in a sorted order according to a constraint.

9. The apparatus of claim 8, wherein the sorted order is an ascending order.

10. The apparatus of claim 8, wherein the sorted order is an descending order.

11. The apparatus of claim 8, wherein the plurality of syntax elements comprise a plurality of LaserAngle[i] syntax elements, where i specifies a respective laser angle of the plurality of elevation laser angles.

12. The apparatus of claim 11, wherein the constraint specifies that a value of LaserAngle[i] shall be greater than or equal to a value of LaserAngle [i-1].

13. The apparatus of claim 8, wherein to encode the plurality of syntax elements that indicate the respective values of the plurality of elevation laser angles, the one or more processors are further configured to: encode at least one respective value of the plurality of elevation laser angles as a delta value relative to another elevation laser angle.

14. The apparatus of claim 8, wherein to encode the point cloud data using the plurality of elevation laser angles, the one or more processors are further configured to:
    encode the point cloud using a binary search process and the plurality of elevation laser angles in the sorted order.

15. The apparatus of claim 8, further comprising:
    a sensor configured to capture the point cloud data.

16. A method of decoding point cloud data, the method comprising:
    decoding a plurality of syntax elements that indicate respective values of a plurality of elevation laser angles, wherein the plurality of syntax elements are decoded in a sorted order according to a constraint; and
    decoding the point cloud data using the plurality of elevation laser angles.

17. The method of claim 16, wherein the sorted order is an ascending order.

18. The method of claim 16, wherein the sorted order is an descending order.

19. The method of claim 16, wherein the plurality of syntax elements comprise a plurality of LaserAngle[i] syntax elements, where i specifies a respective laser angle of the plurality of elevation laser angles.

20. The method of claim 19, wherein the constraint specifies that a value of LaserAngle[i] shall be greater than or equal to a value of LaserAngle [i-1].

21. The method of claim 16, wherein decoding the plurality of syntax elements that indicate the respective values of the plurality of elevation laser angles comprises: decoding at least one respective value of the plurality of elevation laser angles as a delta value relative to another elevation laser angle.

22. The method of claim 16, wherein decoding the point cloud data using the plurality of elevation laser angles comprises:
  decoding the point cloud using a binary search process and the plurality of elevation laser angles in the sorted order.

23. An apparatus configured to decode point cloud data, the apparatus comprising: a memory configured to store the point cloud data; and
  one or more processors implemented in circuitry and in communication with the memory, the one or more processors configured to:
    decode a plurality of syntax elements that indicate respective values of a plurality of elevation laser angles, wherein the plurality of syntax elements are decoded in a sorted order according to a constraint; and
    decode the point cloud data using the plurality of elevation laser angles.

24. The apparatus of claim 23, wherein the sorted order is an ascending order.

25. The apparatus of claim 23, wherein the sorted order is an descending order.

26. The apparatus of claim 23, wherein the plurality of syntax elements comprise a plurality of LaserAngle[i] syntax elements, where i specifies a respective laser angle of the plurality of elevation laser angles.

27. The apparatus of claim 26, wherein the constraint specifies that a value of LaserAngle[i] shall be greater than or equal to a value of LaserAngle [i-1].

28. The apparatus of claim 23, wherein to decode the plurality of syntax elements that indicate the respective values of the plurality of elevation laser angles, the one or more processors are further configured to: decode at least one respective value of the plurality of elevation laser angles as a delta value relative to another elevation laser angle.

29. The apparatus of claim 23, wherein to decode the point cloud data using the plurality of elevation laser angles, the one or more processors are further configured to:
  decode the point cloud using a binary search process and the plurality of elevation laser angles in the sorted order.

30. The apparatus of claim 23, further comprising:
  a display configured to display the decoded point cloud data.

* * * * *